(12) United States Patent
Lee

(10) Patent No.: US 11,387,528 B2
(45) Date of Patent: Jul. 12, 2022

(54) SECONDARY BATTERY

(71) Applicant: Samsung SDI Co., Ltd., Yongin-si (KR)

(72) Inventor: Hyun Soo Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 388 days.

(21) Appl. No.: 16/202,666

(22) Filed: Nov. 28, 2018

(65) Prior Publication Data
US 2019/0237741 A1 Aug. 1, 2019

(30) Foreign Application Priority Data
Jan. 29, 2018 (KR) .................. 10-2018-0010861

(51) Int. Cl.
*H01M 50/581* (2021.01)
*H01M 50/116* (2021.01)
*H01M 50/172* (2021.01)
*H01M 50/531* (2021.01)
*H01M 50/543* (2021.01)

(52) U.S. Cl.
CPC ....... *H01M 50/581* (2021.01); *H01M 50/116* (2021.01); *H01M 50/172* (2021.01); *H01M 50/531* (2021.01); *H01M 50/543* (2021.01); *H01M 2200/103* (2013.01)

(58) Field of Classification Search
CPC ...... H01M 2/0277; H01M 2/26; H01M 2/263; H01M 2/34; H01M 2/348
See application file for complete search history.

(56) References Cited

U.S. PATENT DOCUMENTS

| 8,728,643 | B2 | 5/2014 | Byun |
| 9,570,780 | B2 | 2/2017 | Byun et al. |
| 10,601,023 | B2 | 3/2020 | Wang et al. |
| 2013/0143080 | A1 | 6/2013 | Byun |
| 2015/0280205 | A1 | 10/2015 | Lee et al. |
| 2017/0279157 | A1* | 9/2017 | Lee ........... H01M 2/204 |
| 2017/0317377 | A1 | 11/2017 | Inoue et al. |

(Continued)

FOREIGN PATENT DOCUMENTS

| CN | 204927440 U | 12/2015 |
| CN | 206250272 U | 6/2017 |
| KR | 10-2012-0124026 | 11/2012 |

(Continued)

OTHER PUBLICATIONS

Extended European Search Report for corresponding European Patent Application No. 18214290.1, dated May 20, 2019, 9 pages.

(Continued)

*Primary Examiner* — Stephan J Essex
(74) *Attorney, Agent, or Firm* — Lewis Roca Rothgerber Christie LLP

(57) ABSTRACT

A secondary battery includes an electrode assembly having a current collector tab, a case accommodating the electrode assembly, a cap plate coupled to the case, and a lead tab positioned between the electrode assembly and the cap plate and electrically connecting the current collector tab and the cap plate. The lead tab includes fuse opening, a fixing hole spaced apart from the fuse opening and a protection member surrounding the fuse opening and the fixing hole.

19 Claims, 5 Drawing Sheets

(56) References Cited

U.S. PATENT DOCUMENTS

2018/0159111 A1\* 6/2018 Wang .................. H01M 50/172
2020/0176751 A1 6/2020 Wang et al.

FOREIGN PATENT DOCUMENTS

KR 10-1683209 6/2013
KR 10-1696008 8/2014

OTHER PUBLICATIONS

EPO Office action dated May 11, 2021 issued in corresponding Application No. 18 214 290.1-1108, 7 pages.
Chinese Office action dated Jul. 28, 2021 issued in corresponding CN Application No. 201910018944.4, 9 pages.

\* cited by examiner

SECONDARY BATTERY

CROSS-REFERENCE TO RELATED APPLICATION

This application claims priority to and the benefit of Korean Patent Application No. 10-2018-0010861 filed on Jan. 29, 2018 in the Korean Intellectual Property Office, the contents of which in its entirety are herein incorporated by reference.

BACKGROUND

1. Field

The present invention relates to a secondary battery.

2. Description of the Related Art

Unlike the primary battery that cannot be charged, the secondary battery may be recharged. A low-capacity secondary battery having a single battery cell may be used as the power source for various portable, small-sized electronic devices including cellular phones and camcorders. A high-capacity secondary battery in which several tens of battery cells are connected in a battery pack may be used as the power source for motor drives, such as those in hybrid electric vehicles.

The secondary battery may be manufactured in various shapes. Some representative shapes include a cylindrical shape and a prismatic shape. The secondary battery may also be configured such that an electrode assembly formed by positive and negative electrode plates, a separator as an insulator interposed between the plates, and an electrolyte, are housed in a case with a cap plate coupled to the case.

When an overcharge or an internal short occurs in the secondary battery, the internal pressure of the secondary battery may rise, resulting in the secondary battery igniting or exploding. Thus, there is a need for a secondary battery configured to have improved safety features.

SUMMARY

Embodiments of the present invention provide a secondary battery, which may prevent a region of a fuse opening from being recombined due to an arc generated when the region of the fuse opening is melted and cut, and may reinforce a mechanical strength of a lead tab.

According to an aspect of the present invention, a secondary battery may include an electrode assembly having a current collector tab formed therein, a case accommodating the electrode assembly, a cap plate coupled to a top portion of the case, and a lead tab positioned between the electrode assembly and the cap plate and electrically connecting the current collector tab and the cap plate, wherein the lead tab includes a fuse opening, a fixing hole spaced apart from the fuse opening and a protection member surrounding the fuse opening and the fixing hole.

The lead tab may include a first plate positioned at one side of the lead tab and coupled to the current collector tab, a second plate positioned at the other side of the lead tab, formed to be higher than the first plate, and coupled to the cap plate, and a connecting part connecting the first plate and the second plate and formed slantingly.

The fuse opening may be formed in the first plate, and the fixing hole may include a first fixing hole positioned at one side of the fuse opening and formed in the first plate, and a second fixing hole positioned at the other side of the fuse opening and formed in the connecting part.

The first fixing hole and the second fixing hole may be a pair of circular holes.

The protection member may be formed to extend from one end of the first plate to the connecting part.

The protection member may further include a strength reinforcing unit formed on the lead tab to connect a region of the protection member in the first plate to another region of the protection member in the connecting part. The strength reinforcing unit may include at least one gusset.

The cap plate may include a terminal protrusion part protruding toward the electrode assembly, and a terminal hole engaged with the terminal protrusion part is formed in the second plate.

The fixing hole may be formed in at least one side of the fuse opening and is formed in a polygonal shape.

The protection member may be formed to fill interior portions of the fuse opening and the fixing hole.

The protection member may fill a greater volume of interior portions of the fuse opening than a volume filled by the protection member in interior portions of the fixing hole.

The secondary battery may further include an insulation plate formed between the lead tab and the electrode assembly.

The fuse opening may extend further in a widthwise direction of the lead tab than the fixing hole extends in the widthwise direction.

The fuse opening may have a greater length in a widthwise direction than a length of the fixing hole in the widthwise direction.

The fuse opening may be a slot elongated in a widthwise direction of the lead tab.

The fuse opening may include a plurality of closely spaced openings in a widthwise direction.

The fuse opening may have a different shape than the fixing hole.

The fuse opening may define greater volume than the fixing hole.

The lead tab may have a first cross-sectional area in a widthwise direction of the lead tab at the fuse opening that is less than a second cross-sectional area of the lead tab in the widthwise direction at the fixing hole.

As described above, embodiments of the secondary battery according to the present invention may include fixing holes formed at either side of a fuse opening and a protection member covering the fuse opening and the fixing hole, thereby preventing the region of the fuse opening from being recombined due to an arc generated when the region of the fuse opening is melted and cut, and reinforcing a mechanical strength of a lead tab.

DETAILED DESCRIPTION

Hereinafter, a preferred embodiment of the present invention will be described in detail.

Various embodiments of the present invention may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

In addition, in the accompanying drawings, sizes or thicknesses of various components are exaggerated for brevity and clarity. Like numbers refer to like elements throughout. In addition, as used herein, the term "and/or" includes any and all combinations of one or more of the associated listed items.

In addition, spatially relative terms, such as "below," "beneath," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

Figure 1:
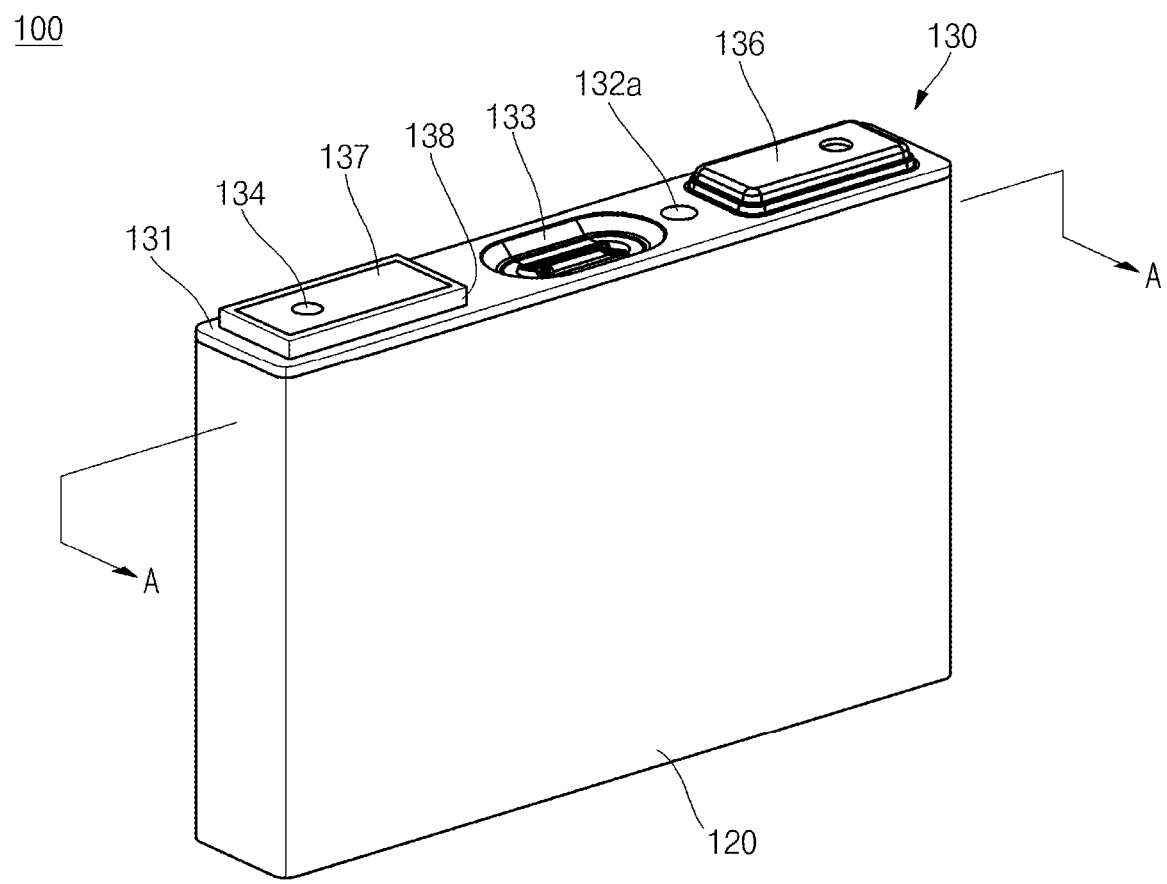
FIG. 1 is a perspective view of a secondary battery according to an embodiment of the present invention.
Figure 2:
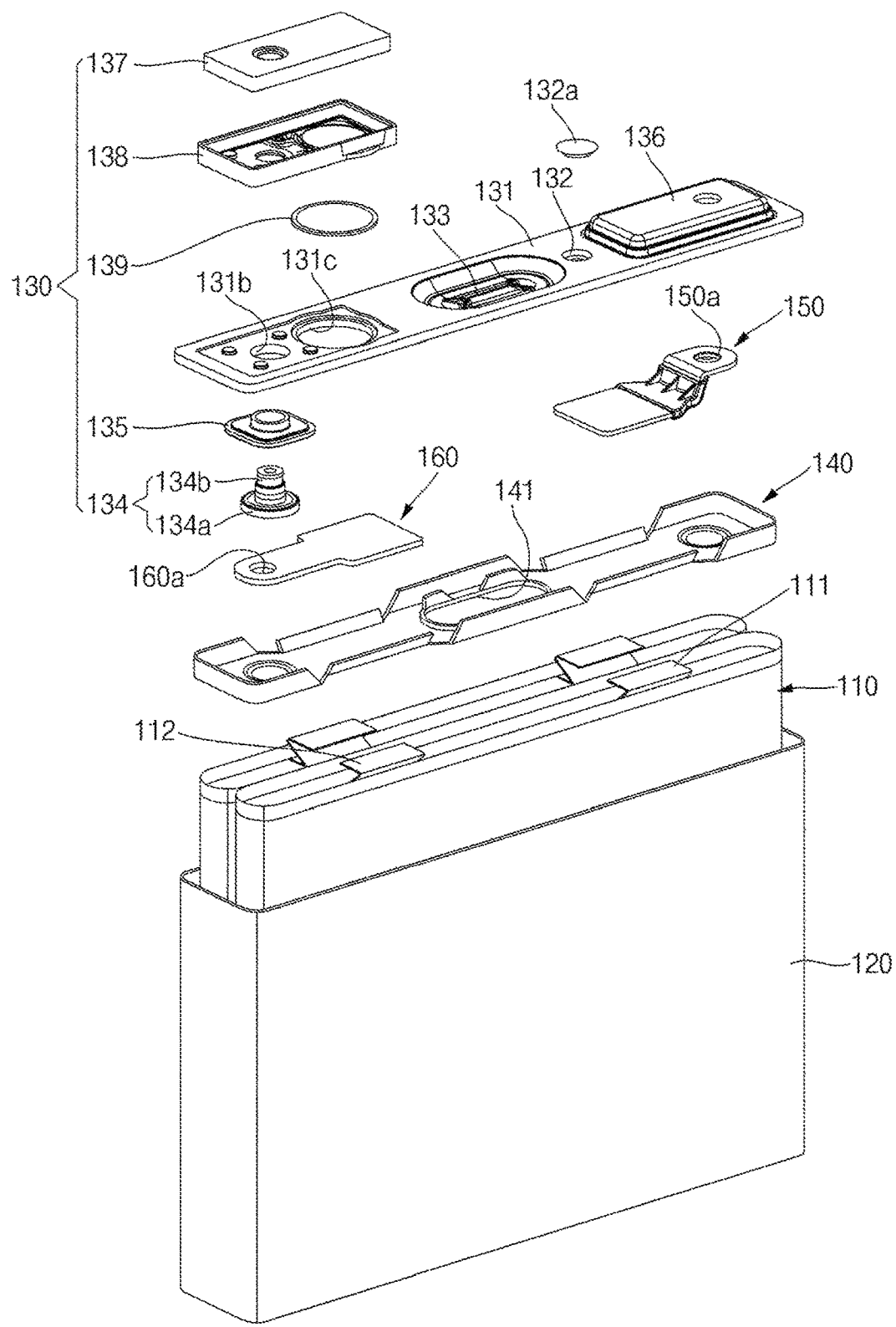
FIG. 2 is an exploded perspective view of a secondary battery according to an embodiment of the present invention.
Figure 3:
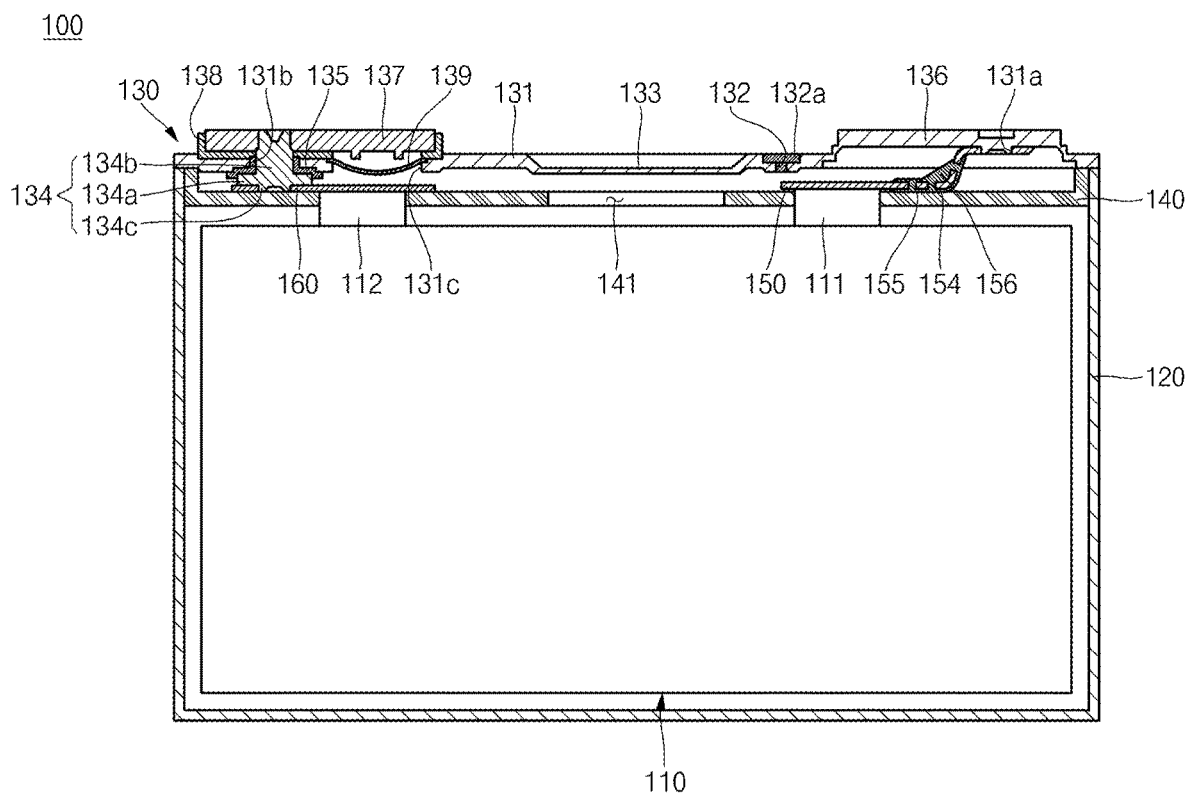
FIG. 3 a cross-sectional view taken along the line A-A of FIG. 1.
Figure 4:
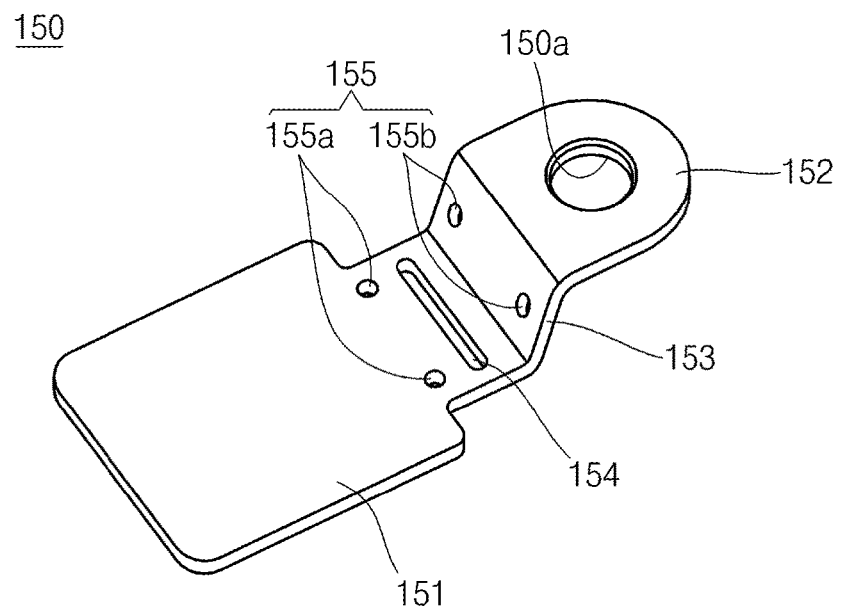
FIG. 4 is a perspective view illustrating a first lead tab of a secondary battery according to an embodiment of the present invention.
Figure 5:
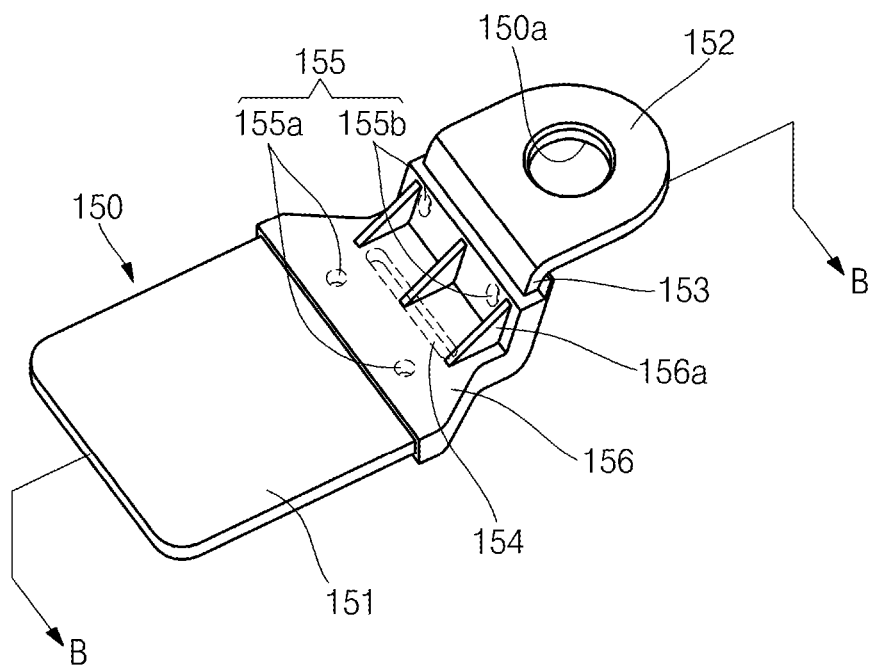
FIG. 5 is a perspective view illustrating a state in which a protection member is coupled to the first lead tab illustrated in FIG. 4.
Figure 6:
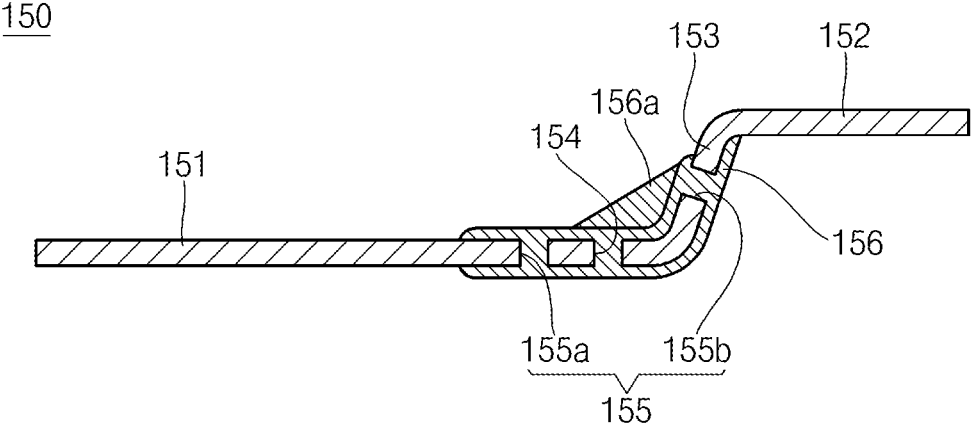
FIG. 6 a cross-sectional view taken along the line B-B of FIG. 5.
Figure 7:
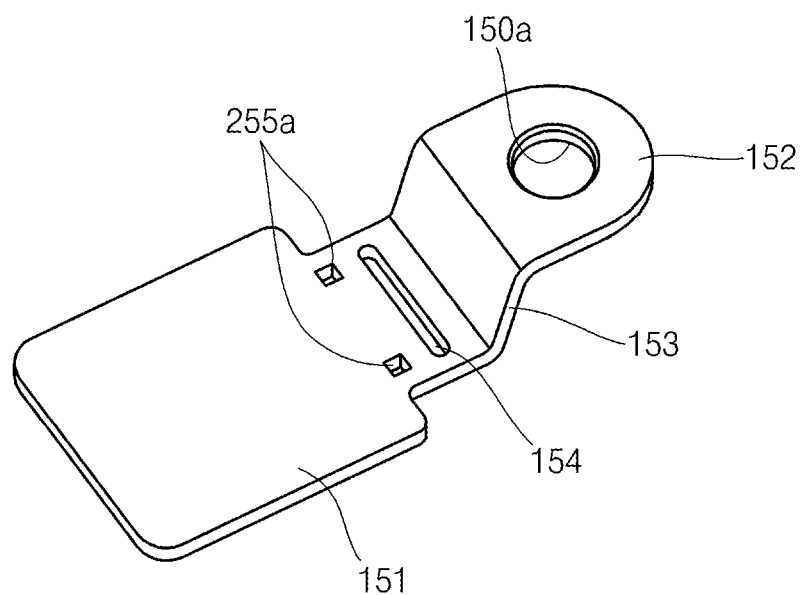
FIGS. 7 and 8 are perspective views illustrating first lead tabs according to various embodiments of the present invention.
Figure 8:
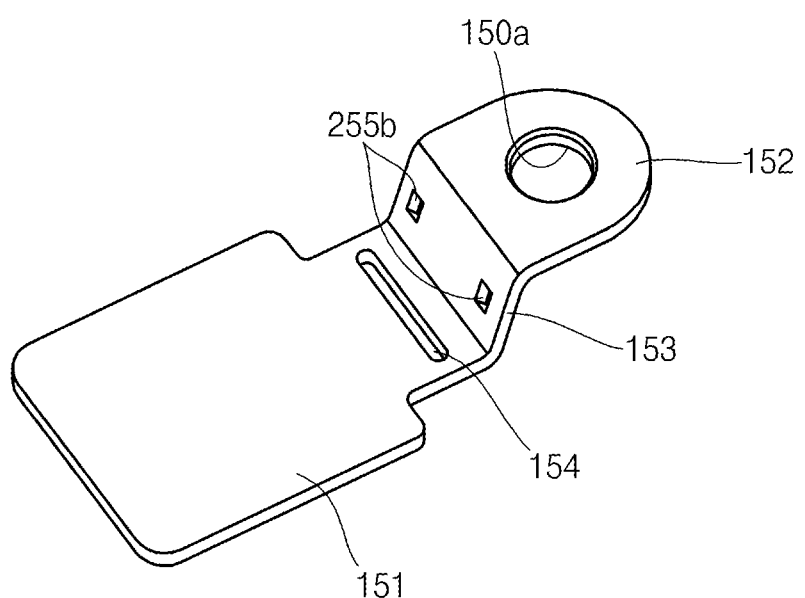

FIG. 1 is a perspective view of a secondary battery according to an embodiment of the present invention. FIG. 2 is an exploded perspective view of a secondary battery according to an embodiment of the present invention. FIG. 3 a cross-sectional view taken along the line A-A of FIG. 1. FIG. 4 is a perspective view illustrating a first lead tab of a secondary battery according to an embodiment of the present invention. FIG. 5 is a perspective view illustrating a state in which a protection member is coupled to the first lead tab illustrated in FIG. 4. FIG. 6 a cross-sectional view taken along the line B-B of FIG. 5. FIGS. 7 and 8 are perspective views illustrating first lead tabs according to various embodiments of the present invention.

Referring to FIGS. 1 to 6, the secondary battery 100 according to an embodiment of the present invention includes an electrode assembly 110, a case 120, a cap assembly 130, an insulation plate 140, and first and second lead tabs 150 and 160.

The electrode assembly 110 is formed by winding or laminating a stack including a first electrode plate, a separator and a second electrode plate, which are thin plates or layers. In some embodiments, the first electrode plate may operate as a positive electrode and the second electrode plate may operate as a negative electrode. One skilled in the art would understand that the polarities of the first electrode plate and the second electrode plate may be selectively changed.

The first electrode plate may be formed by coating a first electrode active material such as a transition metal oxide on a first electrode current collector formed of a metal foil made of aluminum. The first electrode plate may include a first electrode uncoated portion where the first electrode active material is not coated. The first electrode uncoated portion may provide a path for the flow of current between the first electrode plate and the outside.

In addition, one or more first current collector tabs 111 may be formed from the first electrode uncoated portion. The one or more first current collector tabs may be formed to protrude from the first electrode uncoated portion. The one or more first current collector tabs 111 may be formed to overlap each other at a predefined position when one or more first electrode plates are wound, forming a multi-tab structure. To this end, the one or more first electrode plates may be wound in a state in which the one or more first current collector tabs 111 are arranged to be spaced a preset distance apart from one another. Since the one or more first current collector tabs 111 are integrally formed with the one or more first electrode plates and the one or more first current collector tabs are drawn from the one or more first electrode plates, current collecting efficiency of the electrode assembly 110 can be advantageously increased. One skilled in the art would understand that the one or more first current collector tabs 111 may be formed as a separate member from the one or more first electrode plates.

The second electrode plate may be formed by coating a second electrode active material such as graphite or carbon on a second electrode current collector formed of a metal foil made of copper or nickel. The second electrode plate may include a second electrode uncoated portion where the second electrode active material is not coated. The second electrode uncoated portion may provide a path for the flow of current between the second electrode plate and the outside.

In addition, one or more second current collector tabs 112 may be formed from the second electrode uncoated portion so as to correspond to the one or more first current collector tabs 111. The one or more second current collector tabs 112 may also be formed by winding the second electrode plate in a state in which one or more second current collector tabs are arranged to be spaced apart from one another. Therefore, like the one or more first current collector tabs 111, the one or more second current collector tabs 112 may also form a multi-tab structure.

The first and second current collector tabs 111 and 112 may be electrically connected to the first and second lead tabs 150 and 160, respectively. The first and second current collector tabs 111 and 112 may be welded to the first and second lead tabs 150 and 160, respectively, and the insulation plate 140 may be inserted into a lower portion of a resulting structure, followed by bending the first and second current collector tabs 111 and 112, thereby completing the structure shown in FIG. 3.

The separator disposed between the first electrode plate and the second electrode plate may prevent an electrical short therebetween and allow the movement of lithium ions. The separator may include polyethylene, polypropylene, or a composite film of polyethylene and polypropylene. While certain materials are listed with respect to the separator, one skilled in the art would understand that the materials of the separated are not limited to those listed herein.

In addition, the electrode assembly 110 may be received in the case 120 along with an electrolyte. In some embodiments, two or more electrode assemblies 110 may be received in the case 120. The electrolyte may include a lithium salt, such as $LiPF_6$ or $LiBF_4$, dissolved in an organic solvent, such as EC (ethylene carbonate), PC (propylene carbonate), DEC (diethyl carbonate), EMC (ethyl methyl carbonate), or DMC (dimethyl carbonate). In addition, the electrolyte may be in a liquid phase, a solid phase or a gel phase.

The case 120 may be made of a conductive metal, such as aluminum, an aluminum alloy or nickel plated steel. The case 120 may be substantially shaped like a hexahedron having an opening through which the electrode assembly 110 can be inserted and placed. The cap plate 131 may be coupled to the opening of the case 120 to seal the case 120. The internal surface of the case 120 may be subjected to insulation treatment, thereby preventing an electrical short circuit from being generated in the case 120. In many embodiments, one electrode of the electrode assembly 110 may be electrically connected to the case 120 through the cap plate 131. For example, the case 120 may operate as a positive electrode.

The cap assembly 130 may be coupled to a top portion (opening) of the case 120. In many embodiments, the cap assembly 130 includes the cap plate 131, an electrolyte injection hole 132, a safety vent 133, an electrode terminal 134, a gasket 135, a first terminal plate 136, a second terminal plate 137, an upper insulation member 138, and a short-circuit plate 139.

The cap plate 131 may be shaped like a plate to seal the opening of the case 120. The cap plate 131 may be made of the same material as the case 120. The cap plate 131 may be coupled to the case 120 by laser welding. In addition, the cap plate 131 may be electrically independent. In some embodiments, the cap plate 131 may be electrically connected to either the first electrode plate or the second electrode plate. For example, the cap plate 131 may be electrically connected to the first electrode plate. In this example, the cap plate 131 and the case 120 may have the same polarity (e.g., a positive polarity).

In addition, the electrolyte injection hole 132 for injection of an electrolyte may be formed in the cap plate 131. The electrolyte may be injected into the case 120 through the electrolyte injection hole 132. In many embodiments, the electrolyte injection hole 132 may be sealed by a plug 132*a*. In addition, a terminal protrusion part 131*a* protruding downwardly (i.e., toward the electrode assembly 110) may be formed at one side of the cap plate 131. The terminal protrusion part 131*a* may be engaged with a terminal hole 150*a* of the first lead tab 150. Therefore, the cap plate 131 may be electrically connected to the first lead tab 150. In some embodiments, a separate electrode terminal may pass through the cap plate 131 and be coupled to the cap plate 131. The separate electrode terminal may also be coupled to the terminal hole 150*a* of the first lead tab 150.

In addition, the safety vent 133 having a smaller thickness than other regions may be formed at a roughly central portion of the cap plate 131. When the internal pressure of the case 120 exceeds the preset rupture pressure, the safety vent 133 may be ruptured, thereby preventing the secondary battery 100 according to an embodiment of the present invention from exploding.

In addition, an electrode terminal hole 131*b* through which the electrode terminal 134 passes may be formed at one side of the cap plate 131. The electrode terminal 134 may be formed opposite to the terminal protrusion part 131*a* formed in the cap plate 131. The electrode terminal 134 may be coupled to the second lead tab 160 to then be electrically connected to the second electrode plate. The electrode terminal 134 includes a body part 134*a* and a terminal part 134*b* vertically protruding from the body part 134*a*. The terminal part 134*b* may be coupled to the electrode terminal hole 131*b* of the cap plate 131 and has a top portion riveted to be fixed to the cap plate 131. The body part 134*a* may be formed under the terminal part 134*b* and has a larger area than the terminal part 134*b*. In addition, a protrusion 134*c* may be formed on a bottom surface of the body part 134*a* to be engaged with the second lead tab 160. The protrusion 134*c* may be engaged with a terminal hole 160*a* of the second lead tab 160 to electrically connect the electrode terminal 134 to the second lead tab 160.

Additionally, the gasket 135 may be formed in the electrode terminal hole 131*b*. The gasket 135 is made of an insulating material and is coupled to the cap plate 131 from below to seal a gap between the electrode terminal 134 and the cap plate 131. The gasket 135 may prevent external moisture from penetrating into the secondary battery 100 or may prevent the electrolyte received in the secondary battery 100 from flowing out. In addition, the gasket 135 may function to insulate the electrode terminal 134 and the cap plate 131 from each other.

The first terminal plate 136 may be coupled to a top portion of the cap plate 131 having the terminal protrusion part 131*a*. In some embodiments, the first terminal plate 136 may be integrally formed with the cap plate 131 and may be formed to protrude from the cap plate 131. Therefore, the first terminal plate 136 and the case 120 may have the same polarity (e.g., a positive polarity). One skilled in the art would understand that the first terminal plate 136 may be formed separately from the cap plate 131 to then be coupled to the cap plate 131 by welding or forced fitting.

The second terminal plate 137 may be coupled to the electrode terminal 134 protruding towards a top portion of the cap plate 131 through the electrode terminal hole 131*b* of the cap plate 131. In addition, after the second terminal plate 137 is coupled to the electrode terminal 134, a top portion of the electrode terminal 134 may be riveted or welded, thereby fixing the electrode terminal 134 to the second terminal plate 137.

The upper insulation member 138 may be positioned between the second terminal plate 137 and the cap plate 131. The upper insulation member 138 may electrically insulate the electrode terminal 134 from the cap plate 131. The upper insulation member 138 may make close contact with the cap plate 131 and the gasket 135 through the second terminal plate 137.

The short-circuit plate 139 may be formed in a short-circuit hole 131*c* formed at one side of the cap plate 131. In some embodiments, the short-circuit hole 131*c* may be formed in vicinity of the electrode terminal hole 131*b* engaged with the electrode terminal 134. The short-circuit plate 139 may be positioned between the upper insulation member 138 and the cap plate 131 in the short-circuit hole 131*c*. In some embodiments, a hole corresponding to the short-circuit hole 131*c* may also be formed in the upper insulation member 138. The short-circuit plate 139 is formed as an inversion plate including a downwardly convex round portion and a rim portion fixed to the cap plate 131. The short-circuit plate 139 has the same polarity with the cap plate 131. When the internal pressure of the case 120 exceeds a preset reference pressure, the short-circuit plate 139 is inverted (that is, upwardly convexly protrudes) to make contact with the second terminal plate 137 coupled to the electrode terminal 134, thereby causing a short circuit.

The insulation plate 140 is positioned between the cap plate 131 and the electrode assembly 110. The insulation plate 140 protects the electrode assembly 110. In particular, when the cap plate 131 is internally deformed, the insulation plate 140 may prevent the electrode assembly 110 from being damaged. Additionally, the insulation plate 140 may fix a position of the electrode assembly 110 within the case 120. In addition, although not shown, the insulation plate 140 may be coupled to the case 120 in such a manner that its edge portion is placed along the opening of the case 120. In addition, the insulation plate 140 may be coupled to the case 120 in a forced fitting manner. In addition, a vent hole 141 may be formed at a position corresponding to the safety vent 133, thereby easily releasing internal gases generated in the case 120.

The first lead tab 150 may be positioned on the insulation plate 140 and may be electrically connected to the first current collector tab 111 and the terminal protrusion part 131a. In many embodiments, the first lead tab 150 includes a first plate 151 coupled to the first current collector tab 111, a second plate 152 coupled to the terminal protrusion part 131a, and a connecting part 153 connecting the first plate 151 and the second plate 152.

The first plate 151 may be positioned at one side of the insulation plate 140 and may be formed to have a substantially planar plate. The first current collector tab 111 may be welded and coupled to a bottom portion of the first plate 151. Therefore, the first current collector tab 111 may be positioned between the first plate 151 and the insulation plate 140.

The second plate 152 may be formed to be higher than the first plate 151 and may be formed to have a substantially planar plate. Therefore, a step difference may be created between the first plate 151 and the second plate 152. A terminal hole 150a may be formed in the second plate 152, and the terminal protrusion part 131a of the cap plate 131 may be engaged with the terminal hole 150a. Therefore, the second plate 152 may be electrically connected to the cap plate 131.

The connecting part 153 connects the first plate 151 and the second plate 152 and may be slanted (e.g., non-orthogonal to the first plate 151 and/or second plate 152).

In addition, the first lead tab 150 further includes a fuse opening (e.g., a hole) 154, a fixing hole 155 and a protection member 156. The fuse opening 154 may be formed at one side of the first plate 151. The fuse opening 154 may be formed at a portion adjacent to the connecting part 153 in the first plate 151. In one or more embodiments, the fuse opening 154 may be a slot elongated in a widthwise direction (e.g., the direction orthogonal to the lengthwise direction of the first plate 151). The fuse opening 154 may be shaped like, but not limited to, a rectangle. For example, an elongated rectangle orthogonal to a lengthwise direction of the first plate 151. One skilled in the art would understand that various shapes and sizes may be appropriate for the fuse opening 154 in addition to those disclosed herein. In one or more embodiments, the fuse opening 154 is a different shape than the fixing hole 155. In one or more embodiments, the fuse opening 154 defines greater volume than the fixing hole 155. In one or more embodiments, the fuse opening 154 may be a series of closely spaced openings in the widthwise direction (e.g., two or more closely spaced openings aligned or substantially aligned along the widthwise direction). In some embodiments, the fuse opening 154 may be configured to reduce a cross-sectional area of the first plate 151 in the widthwise direction. In these embodiments, when a large amount of current flows in the secondary battery 100 due to a short circuit, heat may be generated in the secondary battery 100 and a region where the fuse opening 154 is formed may be melted and cut by the generated heat, thereby cutting off the flow of current. In one or more embodiments, the fuse opening 154 may be configured to reduce a cross-sectional area of the first plate 151 in the widthwise direction by a greater amount than the fixing hole 155 reduces a cross-sectional area of the first plate 151 (e.g., the first lead tab 150 has a first cross-sectional area in a widthwise direction of the first lead tab 150 at the fuse opening 154 that is less than a second cross-sectional area of the first lead tab 150 in the widthwise direction at the fixing hole 155). In one or more embodiments, the fuse opening 154 may extend further in the widthwise direction than the fixing hole 155 extends in the widthwise direction of the first lead tab 150 (e.g., the fuse opening 154 may have a greater length in the widthwise direction of the first lead tab 150 than a length of the fixing hole 155 in the widthwise direction). In some embodiments, the fuse opening 154 may have a greater length in the widthwise direction than the length of the fixing hole in the widthwise direction.

The fixing hole 155 may be formed at either side of the fuse opening 154. In some embodiments, the fixing hole 155 includes a first fixing hole 155a formed in the first plate 151, and a second fixing hole 155b formed in the connecting part 153. In addition, the first fixing hole 155a and the second fixing hole 155b may be circular holes. The fixing hole 155 may function to fix the protection member 156, which will be described below.

The protection member 156 may be formed to surround a portion of the first lead tab 150. In some embodiments, the protection member 156 may be formed to extend from one end of the first plate 151 to the connecting part 153. In many embodiments, the protection member 156 surrounds the fuse opening 154 and the fixing hole 155. For example, the protection member 156 may surround the top, bottom and side surfaces of the first lead tab 150 having the fuse opening 154 and the fixing hole 155 formed therein. The protection member 156 may also be formed to fill interior portions of the fuse opening 154 and/or the fixing hole 155. Therefore, the protection member 156 may prevent the region of the fuse opening 154 from being recombined due to an arc generated when the region of the fuse opening 154 is melted and cut. In some embodiments, interior portions of the fuse opening 154 define a greater volume than a volume defined by interior portions of the fixing hole 155. In one or more embodiments, the protection member 156 may fill a greater volume of interior portions of the fuse opening 154 than the volume filled by the protection member 156 in interior portions of the fixing hole 155. In many embodiments, since the protection member 156 is formed to fill the fixing hole 155 spaced a predetermined distance apart from the fuse opening 154, it can be fixed to the first lead tab 150. In other words, even when a portion of the protection member 156 is burnt or melted by the arc generated when the region of the fuse opening 154 is melted and cut, the other portion of the protection member 156 is fixed to the first lead tab 150 through the fixing hole 155 so as not to be separated from the first lead tab 150. The protection member 156 may be made of a general insulating material, such as polypropylene or polyethylene, but the present invention does not limit the material of the protection member 156 to those disclosed herein.

In addition, the protection member 156 includes a one or more strength reinforcing units 156a. In one or more embodiments, the strength reinforcing units 156a may include one or more gussets. The one or more strength reinforcing units 156a may be formed on the first lead tab 150 to connect a region of the protection member 156 in the first plate 151 and another region of the protection member 156 in the connecting part 153. In addition, the one or more strength reinforcing units 156a may be formed on a region where the fuse opening 154 is formed to reinforce the mechanical strength of the first lead tab 150.

As illustrated in FIGS. 7 and 8, fixing holes 255a and 255b may be shaped like rectangles. Even if a portion of the protection member 156 is burnt or melted due to an arc generated when the region of the fuse opening 154 is melted and cut, the fixing holes 255a and 255b may function to prevent the protection member 156 from being separated from the first lead tab 150 and rotating. In addition, as illustrated in FIG. 7, the fixing hole 255a may be formed only in the first plate 151. Alternatively, as illustrated in FIG. 8, the fixing hole 255b may be formed only in the connecting part 153. The fixing holes 255a and 255b may be formed in a polygon, such as a triangle, a pentagon, a rectangle, or the like. Therefore, the fixing holes 255a and 255b may be a different shape than the fuse opening 154. In one or more embodiments, only one of the fixing holes 255a and 255b may be formed on each of the first plate 151 and/or the connecting part 153.

The second lead tab 160 may be positioned on the insulation plate 140 and may be electrically connected to the second current collector tab 112 and the electrode terminal 134. The second lead tab 160 may be formed to have a substantially planar plate, and the second current collector tab 112 may be welded or coupled to one side of the second lead tab 160. Therefore, the second current collector tab 112 may be positioned between the second lead tab 160 and the insulation plate 140. In addition, a terminal hole 160a engaged with the protrusion 134c of the electrode terminal 134 may be formed at the other side of the second lead tab 160. While the protrusion 134c is engaged with the terminal hole 160a, the second lead tab 160 is electrically connected to the electrode terminal 134.

As described above, since the secondary battery 100 according to the present invention includes the fixing holes 155 formed at opposite sides of the fuse opening 154 and the protection member 156 covering the fuse opening 154 and the fixing holes 155, the fuse opening 154 may prevent the region of the fuse opening from being recombined due to an arc generated when the region of the fuse opening 154 is melted and cut, and a mechanical strength of the first lead tab 150 may be reinforced. While the secondary battery according to the present invention has been particularly shown and described with reference to an exemplary embodiment thereof, it will be understood by those of ordinary skill in the art that various changes in form and details may be made therein without departing from the spirit and scope of the present invention as defined by the following claims.

What is claimed is:

1. A secondary battery comprising:
an electrode assembly having a current collector tab;
a case accommodating the electrode assembly;
a cap plate coupled to the case; and
a lead tab positioned between the electrode assembly and the cap plate and electrically connecting the current collector tab and the cap plate,
wherein the lead tab comprises a fuse opening, a fixing hole spaced apart from the fuse opening and a protection member surrounding the fuse opening and the fixing hole, the protection member surrounding a top surface, a bottom surface, and outermost side surfaces of a portion of the lead tab including the fuse opening, and
wherein the protection member fills interior portions of the fuse opening and the fixing hole.

2. The secondary battery of claim 1, wherein the lead tab comprises:
a first plate at a side of the lead tab and coupled to the current collector tab;
a second plate at an other side of the lead tab, the second plate being higher than the first plate, and coupled to the cap plate; and
a connecting part connecting the first plate and the second plate, the connecting part being slanted relative to one of the first plate or the second plate.

3. The secondary battery of claim 2, wherein the fuse opening is in the first plate, and
wherein the fixing hole includes a first fixing hole in the first plate at a side of the fuse opening, and a second fixing hole in the connecting part at an other side of the fuse opening.

4. The secondary battery of claim 3, wherein the first fixing hole is a circular hole.

5. The secondary battery of claim 3, wherein the second fixing hole is a circular hole.

6. The secondary battery of claim 2, wherein the protection member extends from one end of the first plate to the connecting part.

7. The secondary battery of claim 6, wherein the protection member further comprises a strength reinforcing unit connecting a region of the protection member on the first plate to another region of the protection member on the connecting part.

8. The secondary battery of claim 7, wherein the strength reinforcing unit comprises at least one gusset.

9. The secondary battery of claim 2, wherein the cap plate includes a terminal protrusion part protruding toward the electrode assembly, and wherein a terminal hole engaged with the terminal protrusion part is in the second plate.

10. The secondary battery of claim 1, wherein the fixing hole has a polygonal shape.

11. The secondary battery of claim 1, wherein the protection member fills a greater volume of interior portions of the fuse opening than a volume filled by the protection member in interior portions of the fixing hole.

12. The secondary battery of claim 1, further comprising an insulation plate between the lead tab and the electrode assembly.

13. The secondary battery of claim 1, wherein the fuse opening extends further in a widthwise direction of the lead tab than the fixing hole extends in the widthwise direction.

14. The secondary battery of claim 1, wherein the fuse opening has a greater length in a widthwise direction than a length of the fixing hole in the widthwise direction.

15. The secondary battery of claim 1, wherein the fuse opening is a slot elongated in a widthwise direction of the lead tab.

16. The secondary battery of claim 1, wherein the fuse opening is a plurality of closely spaced openings in a widthwise direction.

17. The secondary battery of claim 1, wherein the fuse opening is a different shape than the fixing hole.

18. The secondary battery of claim 1, wherein the fuse opening defines greater volume than the fixing hole.

19. The secondary battery of claim 1, wherein the lead tab has a first cross-sectional area in a widthwise direction of the lead tab at the fuse opening that is less than a second cross-sectional area of the lead tab in the widthwise direction at the fixing hole.

* * * * *